US005614931A

United States Patent [19]

Koike et al.

[11] Patent Number: 5,614,931

[45] Date of Patent: Mar. 25, 1997

[54] INK JET RECORDING METHOD

[75] Inventors: Takao Koike; Koichi Naitoh, both of Ebina, Japan

[73] Assignee: Fuji Xerox Co., Ltd., Tokyo, Japan

[21] Appl. No.: 293,461

[22] Filed: Aug. 19, 1994

[30] Foreign Application Priority Data

Aug. 26, 1993 [JP] Japan .................................... 5-211457

[51] Int. Cl.$^6$ .............................. B41J 2/21; G01D 11/00

[52] U.S. Cl. .............................................. 347/43; 347/100

[58] Field of Search ............................ 347/43, 100, 105; 428/323

[56] References Cited

U.S. PATENT DOCUMENTS 5,371,531 12/1994 Rezanka et al. ........................ 347/100
5,387,976 2/1995 Lesniak .................................. 347/100

FOREIGN PATENT DOCUMENTS 62-11781 3/1987 Japan .
3-41171 2/1991 Japan .
4-325574 11/1992 Japan .
4-355157 12/1992 Japan .
4-364961 12/1992 Japan .
6-122208 5/1994 Japan .

*Primary Examiner*—Benjamin R. Fuller
*Assistant Examiner*—Thinh Nguyen
*Attorney, Agent, or Firm*—Oliff & Berridge

[57] ABSTRACT

In an ink jet recording method in which a plurality of different color inks are used to record a color image for every picture element, unitary picture elements are dot matrixes consisting of dots which are printed with ink low in permeability and dots which are printed with ink high in permeability.

17 Claims, 9 Drawing Sheets

FIG. 2

THE PROPERTIES AND CHARACTERISTICS OF INKS
(ABSORPTION COEFFICIENT WITH USING FX-L SHEET)

| | BLACK | CYAN | MAGENTA | YELLOW |
|---|---|---|---|---|
| INK COMPOSITION DYEING | 2.5 | 3.0 | 3.0 | 3.0 |
| DEG | 15.0 | 25.0 | 25.0 | 25.0 |
| BLOCK COPOLYMER | — | 1.0 | 1.0 | 1.0 |
| ION-EXCHANGING WATER | 82.5 | 71.0 | 71.0 | 71.0 |
| VISCOSITY COEFFICIENT (mP·s) | 1.8 | 2.7 | 2.3 | 2.5 |
| SURFACE TENTION (mN/m) | 47 | 36 | 36 | 36 |
| ABSORPTION COEFFICIENT: Ka ($m\ell/m^2 \ell ms^{-1/2}$) | 0.2 | 3.0 | 2.8 | 2.8 |
| WET TIME: TW (ms) | 140 | 10 | 8 | 8 |

BLOCK COPOLYMER: COPOLYMER OF ETHYLENE OXIDE AND PROPYLENE OXIDE
(AVERAGE MOLECULAR 1,700)
(CONTENT OF ETHYLENE OXIDE 30%)

THE PROPERTIES OF FX-L SHEET

| ITEM | THE STANDARD VALUE |
|---|---|
| THICKNESS (mm/1000) | 85±3 |
| WEIGHTING CAPACITY (g/m2) | 64+3.0−1.0 |
| DEGREE OF SMOOTHNESS Fs (sec) | Min. 30 |
| DEGREE OF SMOOTHNESS Ws (sec) | Min. 25 |
| DEGREE OF VENTILATING (sec) | Min. 10 |
| DEGREE OF WATER CONTENT UPON OPENING (%) | 4.0～5.4 |
| DEGREE OF WHITENESS (%) | 80.5±2.5 |
| DEGREE OF ASH CONTENT (%) | 5 |

FIG. 8(a)

| | NUMBER OF INK DOT OF BLACK IMAGE AREA MATRIX (4×4) | | | COLOR BLEEDING | THE CHARACTER AND LINE IMAGES | BLACK COLOR |
|---|---|---|---|---|---|---|
| | Bk | CYAN | OVERLAP | | | |
| 1ST EMBODIMENT | 8 | 8 | 0 | ○ | ○ | ○− (SOMEWHAT BLUISH) |
| 2ND EMBODIMENT | 6 | 10 | 0 | ○ | ○ | ○− (BLUISH) |
| 3RD EMBODIMENT | 12 | 8 | 4 | ○ | ○ | ○ |
| 1ST COMPARISON | 12 | 4 | 0 | × | △ | △ (CONCENTRATION IRREGULARITY) |
| 2ND COMPARISON | 4 | 12 | 0 | ○ | × | × (DARK CYAN) |

FIG. 8(b)

| | NUMBER OF INK DOT OF BLACK IMAGE AREA MATRIX (4×4) | | | | COLOR BLEEDING | THE CHARACTER AND LINE IMAGES | BLACK COLOR |
|---|---|---|---|---|---|---|---|
| | Bk | C | M | Y | | | |
| 4TH EMBODIMENT | 8 | 3 | 3 | 2 | ○ | ○ | ○ |
| 5TH EMBODIMENT | 8 | 4 | 4 | 4 | ○ | ○ | ○ |
| 3RD COMPARISON | 10 | 2 | 2 | 2 | × | △ | △ (CONCENTRATION IRREGULARITY) |
| 4TH COMPARISON | 4 | 4 | 4 | 4 | ○ | × | △ (GRAY) |

FIG. 8(c)

| | NUMBER OF INK DOT OF BLACK IMAGE AREA MATRIX (4×4) | | | COLOR BLEEDING | THE CHARACTER AND LINE IMAGES | BLACK COLOR |
|---|---|---|---|---|---|---|
| | Bk | CYAN | OVERLAP | | | |
| 6TH EMBODIMENT | 8 | 8 | 8 | ○ | ○ | ○− (SOMEWHAT BLUISH) |
| 5TH COMPARISON | 6 | 6 | 6 | ○ | × | △ (CONCENTRATION IRREGULARITY) |

INK JET RECORDING METHOD

BACKGROUND OF THE INVENTION

This invention relates to an ink jet recording method in which a plurality of inks different in color are used to record a color image for every picture element.

In general, an ink jet printer for recording images with ink droplets jetted from the nozzles, being simple in construction, can be miniaturized and manufactured at low cost. In addition, the ink jet printer is advantageous in that images can be recorded in black and white or in color on sheets of ordinary paper such as sheets for papers submitted for instance by students (hereinafter referred to as "paper sheets", when applicable) or copying sheets.

A conventional ink jet printer is designed as follows: That is, the ink jet printer has an ink jetting energy producing unit comprising piezo-electric elements or electrothermic conversion elements as an ink jetting source. The ink jetting source is operated to jet ink droplets from the nozzles. As shown in FIG. 13, the ink droplets 101 thus jetted (only one ink droplet shown) are stuck onto and absorbed by a recording medium 100 such as a recording sheet provided only for the printer or a sheet of ordinary paper such as a paper sheet or copying sheet, thus recording an image on it. The printing operation is relatively low in noise. In addition, with the ink jet printer, an image can be recorded not only in black and white but also in color without a fixing process.

On the other hand, in the case where it is required for the ink jet printer to record an image in full-color on a recording medium low in ink absorptivity such as a copying sheet generally used with an electrophotographic copying machine or a paper sheet instead of the recording sheet provided only for the printer, the ink jet printer suffers from the following difficulties: If, in this case, the full-color image recording operation is carried out with the ink which dries slowly to record character or line images with high picture quality, then as shown in FIG. 14 the ink droplets 101 stuck on the recording medium 100, not being immediately dried, flow, so that the adjacent ink droplets 101 meet each other. As a result, so-called "color bleeding" occurs between the adjacent ink droplets different in color; that is, colors are unintentionally mixed with each other. Thus, the resultant color image is low in picture quality.

On the other hand, in the case where a copying sheet or paper sheet is employed as the recording medium, and the ink is used which dries and permeates relatively quickly, the color bleeding between the adjacent ink droplets different in color is suppressed. However, as shown in FIG. 15, the ink droplets 101 immediately permeate the recording medium deep, so that no color materials remain on the surface of the sheet. Hence, the regions printed with the ink droplets 101 are low in density, and small in the range of color reproducibility, and the contours of the recorded character or line images are relatively heavy, and feathering occurs, so that the recorded image is considerably low in picture quality.

In order to overcome the above-described problems, the ink jet printer has employed the following method: In the method, the picture quality of the color image takes precedence over the others: that is, the color inks are increased in drying speed to prevent the occurrence of the aforementioned "color bleeding", thereby to improve the picture quality of the color image recorded thereby. More specifically, as disclosed by Japanese Patent Application Publication No. 11781/1987 a surface active agent is added to the inks, or as proposed by the present Applicant a block copolymer of propylene oxide and ethylene oxide is added to the inks (cf. Japanese Patent Application (OPI) No. 325574/1992 (the term "OPI" as used herein means an "unexamined published application")), to increase the permeability of the inks.

In the case where all the color inks used are high in drying speed, as shown in FIG. 15 the inks permeate the sheet more in the direction of depth (thickness) than in the other directions, and accordingly the record on the surface of the sheet is lowered in density, and the character and line images recorded with the black ink is deteriorated in picture quality. Hence, in a color ink jet printer using black ink together with cyan, magenta and yellow inks, in order to record characters with high density, only the black ink is low in permeability.

However, the above-described conventional ink jet printer still suffers from the following problem: That is, when, in the case where the ink jet printer uses color inks high in permeability and black ink low in permeability, the region of an image recorded with an ink high in permeability merges with the region of an image recorded with an ink low in permeability, then as shown in FIG. 14 the latter ink low in permeability diffuses into the former ink high in permeability, so that bleeding occurs between the black ink and the color ink. Thus, the resultant image is low in picture quality.

SUMMARY OF THE INVENTION

Accordingly, an object of this invention is to solve the above-described problems accompanying a conventional ink jet printer. More specifically, an object of the invention is to provide an ink jet recording method which is able to record character images high in density on sheets of ordinary paper such as copying sheets instead of special recording sheets provided only for ink jet recording, and prevents the occurrence of color bleeding between images different in color.

The above-described problems have been solved by the provision of an ink jet recording method in which a plurality of different color inks are used to record a color image for every picture element; in which, according to the invention, unitary picture elements are dot matrixes consisting of low-permeable ink dots which are recorded with ink low in permeability and high-permeable ink dots which are recorded with ink high in permeability.

In the method, the unitary picture elements may be dot matrixes consisting of low-permeable ink dots which are recorded with ink low in permeability and high-permeable ink dots which are recorded, adjacent to the low-permeable ink dots, with ink high in permeability.

In the method, the ratio in number of the high-permeable ink dots to the low-permeable ink dots is in a range of from 50% to 200%.

In the method, the unitary picture elements may be dot matrixes consisting of lapped ink dots formed by lapping the low-permeable ink dots and the high-permeable ink dots on each other, and empty dots having no ink dot.

The ratio in number of the empty dots to the lapped ink dots is in a range of from 0% to 100%.

In the method, the ink low in permeability is a black ink.

And, after the ink low in permeability is used for printing dots, the ink high in permeability is used for printing dots.

Further, in the method, the ink low in permeability is lower in lightness than the ink high in permeability.

Furthermore, in the method, the unitary picture elements, which are the dot matrixes consisting of the low-permeable ink dots and high-permeable ink dots, are located at the boundary of image regions different in color.

Moreover, in the method, the unitary picture elements are part of a line or character image.

In addition, in the method, the ink low in permeability is up to 0.5 $ml/m^2\ ms^{1/2}$ in absorption coefficient (Ka) and in a range of 50 to 200 msec in wet time (Tw), and the ink high in permeability is up to 1.0 $ml/m^2\ ms^{1/2}$ in absorption coefficient (Ka), and up to 20 msec in wet time (Tw).

In the ink jet recording method of the invention, the unitary picture elements are dot matrixes consisting of low-permeable ink dots which are printed with ink low in permeability and high-permeable ink dots which are printed with ink high in permeability. Hence, in the unitary picture element, the ink low in permeability and the ink high in permeability mix with and diffuse into each other, so that in the picture element the resultant ink is high in permeability. Hence, even if the picture element is located in contact with a picture element in which the dots are only of the ink high in permeability, no color mixing (color bleeding) occurs. In this connection, by forming the dot matrix in such a manner that a low-permeable ink dot is surrounded by high-permeable ink dots, the two different inks can be mixed with each other instantaneously. In order to print a black image whose picture quality is in the allowable range, the ratio in number of low-permeable black dots should be increased as much as possible; however, it has been found through research that the above-described requirement is satisfied when the ratio in number of high-permeable ink dots to low-permeable ink dots is in a range of 50 to 200%. In addition, the following fact has been found: In the case where the unitary picture element consists of lapped ink dots obtained by lapping the low-permeable ink dots and high-permeable ink dots on each other, and empty dots having no ink dots, the ratio in number of the empty dots to the lapped ink dots should be in a range of 0 to 100%. With the ratio in the range, the difficulty is eliminated that the picture quality is lowered for instance because color bleeding occurs, or some of the dots are not recorded; that is, the picture quality is in the allowable range.

The permeability of ink is represented by an absorption coefficient (Ka), and an ink wet time (Tw). The absorption coefficient (Ka) and the ink wet time (Tw) are measured with a Bristow tester according to Japan Tappi paper and pulp testing method No. 51–87. The measurement is carried out as shown in FIG. 16. That is, a predetermined quantity of ink is stored in a head box, and a sheet of paper is wound on the outer surface of a rotating cylinder. Under this condition, the cylinder is turned to cause the ink to transfer onto the sheet of paper. The quantity of ink thus transferred is measured. By changing the speed of rotation of the cylinder, the quantities of ink transferred onto the sheet of paper for contact times, 0.004 to 2 seconds, for which the sheet of paper is held in contact with the head box, is measured. FIG. 7 is a graphical representation indicating the contact times with the quantities of ink transferred onto the sheet of paper for the contact times. In FIG. 7, the contact times plotted on the horizontal axis are indicated by the square roots thereof, and the slope of the curve is the absorption coefficient (Ka). The amount of ink transferred for a contact time of 0 sec is referred to as a roughness coefficient (Vr), representing the quantity of ink which goes into the uneven surface of the sheet of paper. When the head box is brought into contact with the surface of the sheet of paper wound on the cylinder, the ink is not immediately absorbed by the sheet of paper; that is, it just wets the latter for a short period of time (Tw), which is called "ink wet time". In other words, the ink wet time elapses to wet the sheet of paper with the ink.

The absorption coefficient (Ka) is equivalent with the result of calculation of the following Rucas-Washborn expression with the absorption time (t) as parameter:

$$V=(\epsilon/\tau)\{(r\cos\theta)\gamma t/2\eta\}^{1/2}$$

where V is the quantity of ink absorbed per unitary time, $\epsilon$ is the porosity of the sheet, $\tau$ is the curvature of a capillary tube in the surface of the sheet, r is the diameter of the capillary tube in the surface of the sheet, $\cos\theta$ is the angle of contact between the sheet and the ink, $\gamma$ is the surface tension of the ink, t is the ink absorption time, and $\eta$ is the ink viscosity That is, the ink absorption coefficient (Ka) is determined by the state of the surface of the sheet of paper, the properties of the ink, and the wettability of the sheet of paper with the ink.

When heat or electro-magnetic wave is applied to a recording medium, namely, a sheet of paper, the materials of the latter are changed in physical property—for instance the coefficient of contraction of the fibers, the porosity of the sheet of paper and the diameter of pores therein are affected—so that the ink absorption coefficient (Ka) is increased. Furthermore, the ink absorption coefficient (Ka) is increased in the following case: That is, when the ink is stuck onto a sheet of paper, its temperature is increased instantaneously, so that the ink viscosity ($\eta$) is decreased, whereby the ink absorption coefficient (Ka) is increased. On the other hand, the ink wet time (Tw) depends on the wettability of the sheet of paper with respect to the ink; that is, the contact angle between the sheet of paper and the ink, and the surface tension of the ink. Thus, the ink wet time (Tw) is substantially determined from the ink and the sheet of paper.

BRIEF DESCRIPTION OF THE DRAWINGS

FIG. 2 is a table listing the compositions, properties and characteristics of inks.

FIGS. 8(*a*), 8(*b*), and 8(*c*) are tables listing the evaluations of prints.

DETAILED DESCRIPTION OF THE PREFERRED EMBODIMENTS

Figure 1:
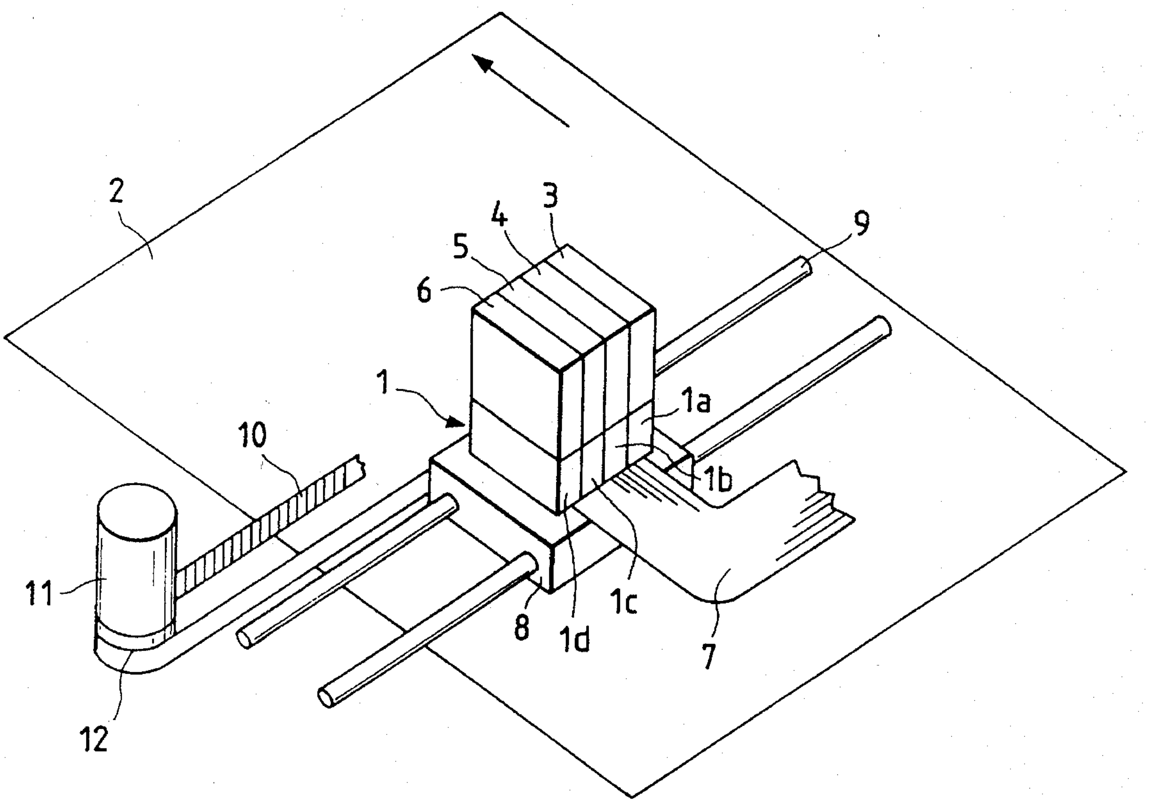
FIG. 1 is a perspective view showing an example of an ink jet recording device to which an ink jet recording method according to the invention is applicable.

FIG. 1 shows an example of an ink jet recording device to which an ink jet recording method according to the invention is applicable.

In FIG. 1, reference numeral 1 designates a recording head which comprises four recording sections 1*a*, 1*b*, 1*c* and 1*d* corresponding respectively to black, cyan, magenta and yellow. The recording head has nozzles on the lower end face (in FIG. 1). Those recording sections 1*a*, 1*b*, 1*c* and 1*d* operate to jet black, cyan, magenta and yellow inks from the nozzles according to image data, to record an image on a recording medium, namely, a recording sheet 2. Ink tanks 3, 4, 5 and 6 which contain black, cyan, magenta and yellow inks, respectively, are mounted on the above-described recording sections 1*a*, 1*b*, 1*c* and 1*d*, respectively. Those recording sections 1*a*, 1*b*, 1*c* and 1*d* are connected to a signal cable 7 adapted to transmit head drive signals, which are formed by developing binary-encoded color image data of black, cyan, magenta and yellow into dot patterns.

The recording head 1 is fixedly mounted on a carriage 8, which is mounted on two guide rods 9 in such a manner that it is slidable in the main scanning direction. The carriage 8 is connected to the end of a timing belt 10. The latter 10 is wound on a drive pulley 12 which is rotated by a drive motor 11. As the drive motor 11 is driven with predetermined timing, the head carriage 8 is moved in the main scanning direction through the timing belt 10, so that the recording head 1 records an image in predetermined colors on the recording sheet 2. In the recording sections 1*a*, 1*b*, 1*c* and 1*d* of the recording head 1, for instance 256 nozzles are arranged in a line perpendicular to the scanning direction of the head carriage 8, 400 nozzles per inch.

A platen (not shown) made of a thin metal plate is fixedly provided below the recording head 1. The recording sheet 2 is moved in the direction of the arrow with predetermined timing by a sheet feeding roller (not shown).

The ink tank 3 is filled with a black ink low in permeability, and the ink tanks 4, 5 and 6 are filled with cyan, magenta and yellow inks which are high in permeability, respectively; that is, those ink tanks 3, 4, 5, and 6 supply the black, cyan, magenta and yellow inks to the recording sections 1*a*, 1*b*, 1*c* and 1*d* of the recording head 1, respectively.

In the ink jet recording device, the head carriage 8 is moved to the right by the drive motor 11, so that the recording head 1 fixedly mounted on the head carriage 8, while being scanned, jets ink to record an image on the recording sheet 2. In this operation, the drive circuit of the recording head 1 is driven by dot data which are obtained by developing the color image data into dot patterns. When the recording is accomplished as much as one line, then the recording sheet 2 is fed (moved) as much as one line by the sheet feeding roller (not shown). At the same time, the recording head 1 is returned to the left in FIG. 1, to start recording the next line.

In the above-described ink jet printer, a unitary picture element recorded by the recording sections 1*a*, 1*b*, 1*c* and 1*d* of the recording head 1 is a dot matrix consisting of dots which are printed with ink low in permeability (hereinafter referred to as "low-permeability ink dots", when applicable) and dots which are printed with ink high in permeability (hereinafter referred to as "high-permeability ink dots", when applicable). The low-permeable ink dots are of black ink, and the high-permeability ink dots are of color inks such as cyan, magenta and yellow inks. The ink low in permeability is 0.5 $ml/m^2\ ms^{1/2}$ or less in absorption coefficient (Ka) and in a range of 50 to 200 msec in wet time (Tw), and the ink high in permeability is 1.0 $ml/m^2\ ms^{1/2}$ or less in absorption coefficient (Ka), and 20 msec or less in wet time (Tw).

Those inks have compositions and properties as listed in FIG. 2. The recording sheet 2 on which images are recorded with those inks may be an "L" sheet manufactured by Fuji Xerox Company, which is a copying sheet having properties as shown in FIG. 3.

Figures 3, 4:
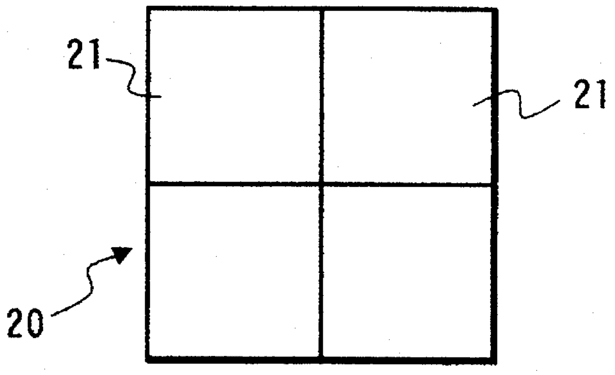
FIG. 3 is also a table listing the properties of a recording sheet.
FIG. 4 is an explanatory diagram showing ink dots.

In the ink jet printer of the invention, as shown in FIG. 4 a unitary picture element 20 is made up of 4×4 dot matrixes 21. However, the invention is not limited thereto or thereby. That is, it may replaced by other dot matrixes such as 2×2, 3×3, 3×4 and 8×8 dot matrixes.

As conducive to a full understanding of the method according to the invention, its embodiments and comparisons will be described.

First Embodiment

Figure 5:
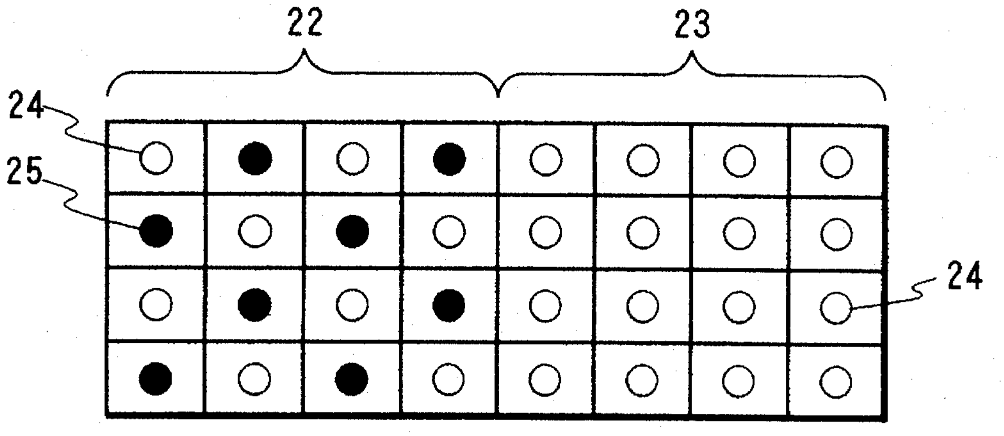
FIG. 5 is a simplified explanatory diagram showing an example of a print.
Figure 6:
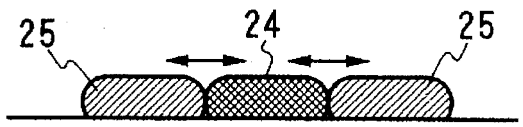
FIG. 6 is a simplified explanatory diagram for a description of the mixing of adjacent ink dots.

FIG. 5 is for a description of a first embodiment of the ink jet recording method according to the invention. As shown in FIG. 5, a black image 22 is adjacent to a cyan image 23; in other words, the color image region 23 consisting of cyan ink dots only is set adjacent to the color image region 22 in which black ink dots 24 and cyan ink dots 25 are arranged alternately in such a manner that they are equal in number to each other both in a horizontal direction and in a vertical direction. That is, in the first embodiment, the high-permeable cyan ink dots 24 were printed next to the low-permeability black ink dots 25. In this case, as shown in FIG. 6 the low-permeability black ink dot 25 was mixed with the high-permeability cyan ink dot 24 printed next to it. The mixing of the ink dots made the low-permeability black ink dot 25 equal in permeability to the high-permeability cyan ink dot 24, and therefore no color bleeding occurred between the black image region 22 and the cyan image region 23. On the other hand, a character or line image whose background has no color image, is recorded with the low-permeability black ink dots 25 only, and therefore the black ink dots 25 met with one another on the recording sheet 2. Thus, the resultant image was excellent in sharpness and in linearity.

Figure 7:
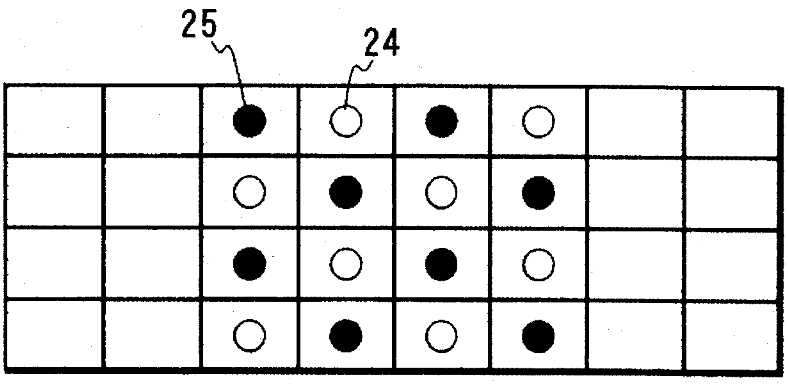
FIG. 7 is a simplified explanatory diagram showing another example of the print.

In the black image region 22, black and cyan were mixed, Therefore, the region 22 was bluish black; however, no color bleeding occurred at the boundary of the different color regions. Furthermore, the black character or line image with a color background was excellent in picture quality. FIG. 7 shows a color image which was formed on a white background by arranging the black ink dots 25 and the cyan ink dots 24 alternately in such a manner that they were equal in number to each other both in horizontal direction and in vertical direction. The image was free from color bleeding and dried quickly. FIGS. 5 to 11 show only unitary picture elements adjacent to each other on the boundary of different color regions.

Second Embodiment

In a second embodiment of the method of the invention, the arrangement of ink dots was similar to that of the first embodiment; however, the ratio in number of cyan dots to black dots was made larger than in the first embodiment. That is, as indicated in FIG. 8, six (6) black dots and ten (10) cyan dots were provided for a 4×4 (=16) unitary picture element.

In the second embodiment, in the black image region, the black was more bluish, and no color bleeding occurred. The black character or line image with a color background was satisfactory in picture quality.

Third Embodiment

Figure 10A:
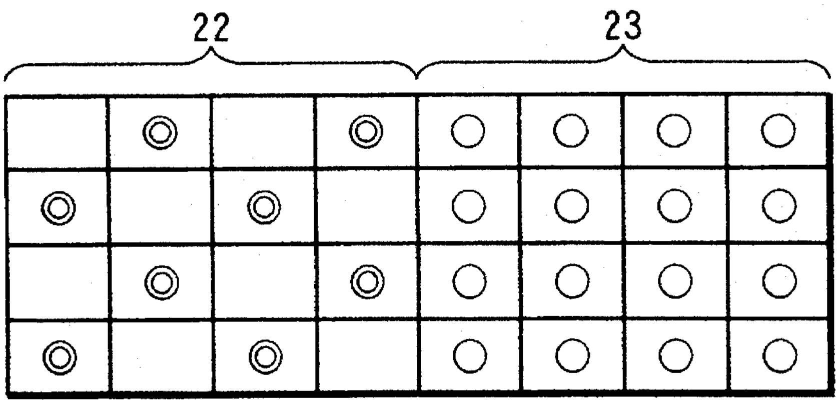
FIG. 10(*a*) is a simplified explanatory diagrams showing another example of the print, and FIG. 10(*b*) is an explanatory diagram for a description of the lapping of ink dots on each other.
Figure 10B:
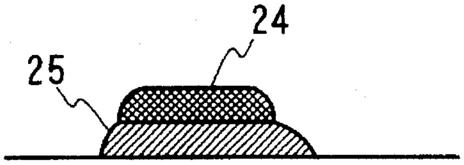

In a third embodiment of the method of the invention, the arrangement of ink dots was similar to that of the first embodiment; however, the ratio in number of black dots to cyan dots was made larger than in the first embodiment. That is, as indicated in FIG. 8, twelve (12) black dots and eight (8) cyan dots were provided for a 4×4 (=16) unitary picture element, and some of the black dots were printed on the predetermined ones of the cyan dots as indicated in FIG. 10(*b*).

In the third embodiment, in the black image region, the black color was less bluish, and no color bleeding occurred. The black character or line image with a color background was satisfactory in picture quality.

Fourth Embodiment

Figure 9:
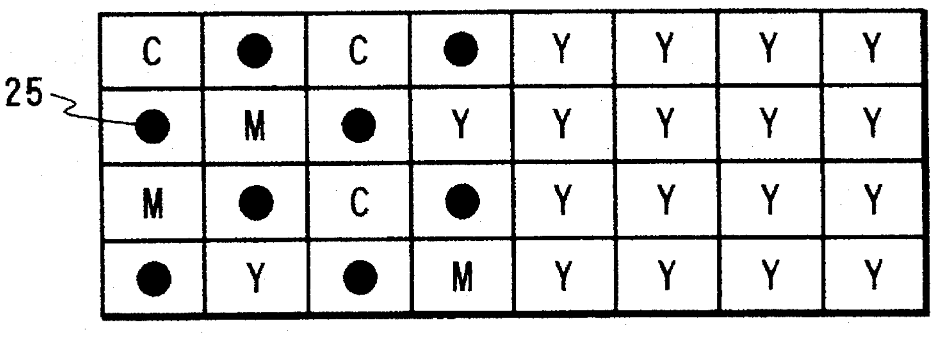
FIG. 9 is a simplified explanatory diagram showing another example of the print.

In a fourth embodiment of the method according to the invention, as shown in FIG. 9 the cyan dots in the first embodiment were replaced with cyan, magenta and yellow ones. As is indicated in FIG. 8, the color bleeding was not observed similarly as in the case of the first embodiment, and the black color was more improved in hue than in the case of the first embodiment. The black characters and lines with a color background were satisfactory in picture quality.

Fifth Embodiment

In a fifth embodiment of the method according to the invention, the arrangement of ink dots was similar to that in the fourth embodiment; however, the number of color ink dots was larger than in the fourth embodiment as indicated in FIG. 8. In the fifth embodiment, the black color was improved in hue, and no color bleeding took place, and similarly as in the case of the fourth embodiment, the black characters and lines with a color background were satisfactory in picture quality.

First Comparison

In a first comparison for the method of the invention, the arrangement of ink dots was similar to that in the first embodiment; however, the ratio in number of black ink dots to cyan ink dots was higher than in the first embodiment. In the first comparison, as indicated in FIG. 8 color bleeding occurred, and the black characters and lines with a color background were unacceptable in picture quality.

Second Comparison

In a second comparison for the method of the invention, in contrast to the first comparison, the ratio in number of cyan ink dots to black ink dots was increased. In the second comparison, as indicated in FIG. 8 no color bleeding occurred; however, the black color was too bluish to be regarded as black.

Third Comparison

In a third comparison for the method of the invention, the arrangement of ink dots was similar to that in the fourth or fifth embodiment; however, the ratio in number of black ink dots to color ink dots was higher than in the fourth or fifth embodiment. In the third comparison, as indicated in FIG. 8 color bleeding occurred, and the black characters and lines with a color background were unacceptable in picture quality.

Fourth Comparison

In a fourth comparison for the method of the invention, in contrast to the third comparison, the ratio in number of color ink dots to black ink dot was increased. In the fourth comparison, as indicated in FIG. 8 no color bleeding took place; however, the picture quality of the black characters and lines was out of the allowable range.

In the following examples, a sixth embodiment and a fifth comparison, a dot matrix was used which was made up of ink dots which were formed by lapping low-permeable ink dots and high-permeable ink dots on each other, and empty dots having no ink dot.

Sixth Embodiment

Figure 11:
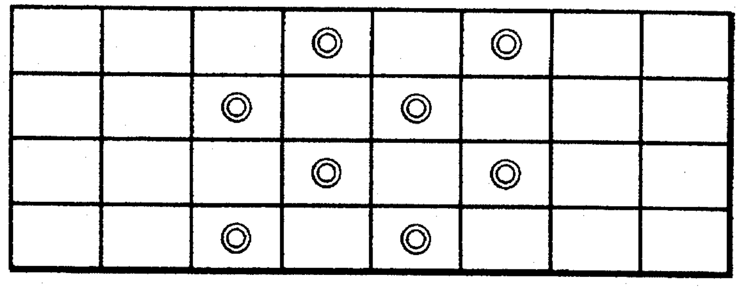
FIG. 11 is a simplified explanatory diagram showing another example of the print.

In a sixth embodiment of the method of the invention, as shown in FIG. 10 ink dots 30 formed by printing black dots on cyan dots were arranged every other dot both in a horizontal direction and in a vertical direction, and accordingly an empty dot existed between adjacent ink dots 30. In the six embodiment, as indicated in FIG. 8 the print was equivalent in picture quality to that in the first embodiment. FIG. 11 shows an example of a print in which the dot matrix is recorded on a white background which, as was described above, is made up of the ink dots which are formed by printing black dots on cyan dots and arranged every other dot both in a horizontal direction and in a vertical direction, and the empty dots located between the ink dots. In this case, the resultant print was free from color bleeding, and dried quickly.

Fifth Comparison

Figure 12:
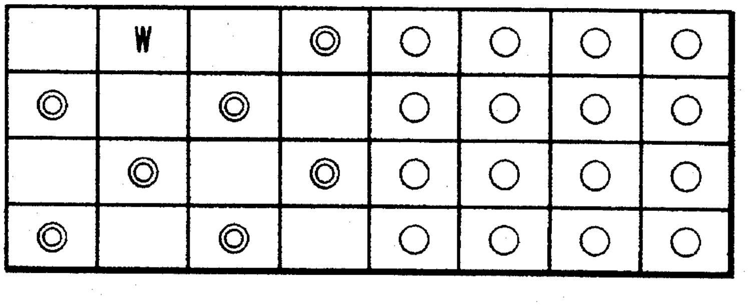
FIG. 12 is a simplified explanatory diagram showing another example of the print.
Figure 13:
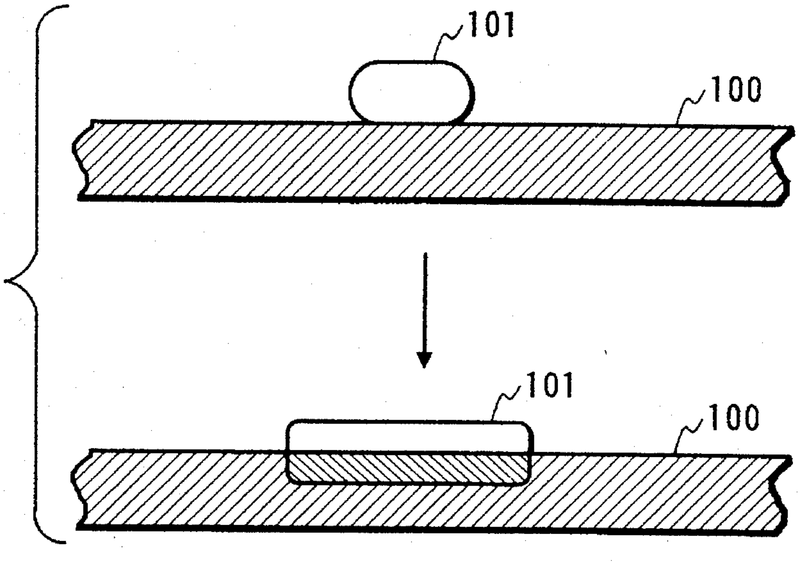
FIG. 13 is an explanatory diagram showing the behavior of an ink droplet on a sheet of paper.
Figure 14A:
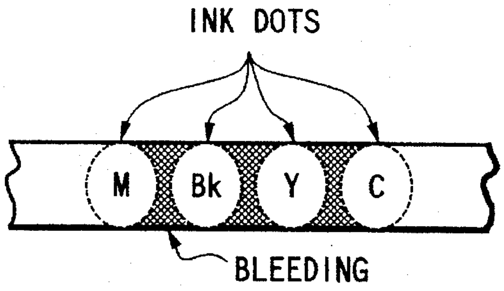
FIGS. 14(*a*) and 14(*b*) are simplified explanatory diagram for a description of the permeation of inks into a recording medium.
Figure 14B:
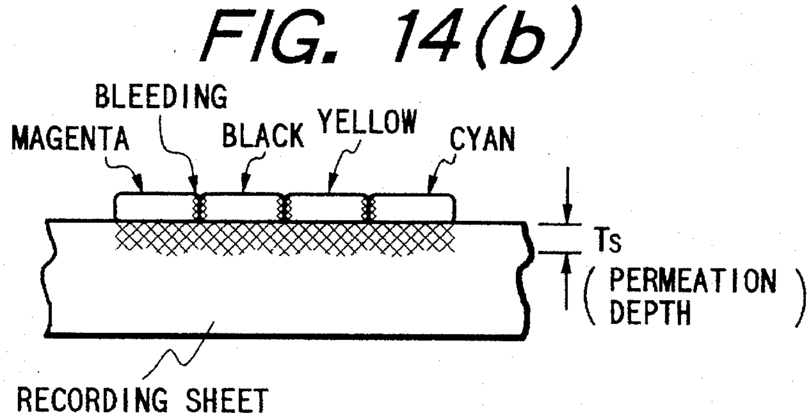
Figure 15A:
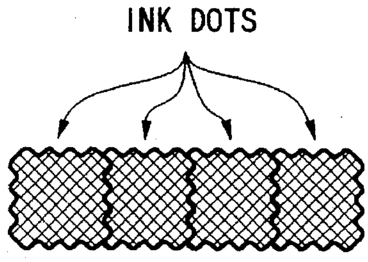
FIGS. 15(*a*) and 15(*b*) are also simplified explanatory diagram for a description of the permeation of inks into a recording medium.
Figure 15B:
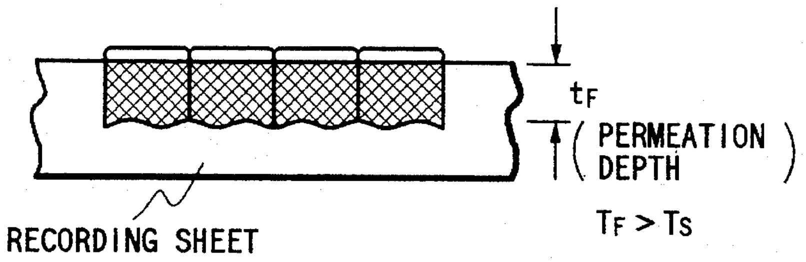
Figure 16:
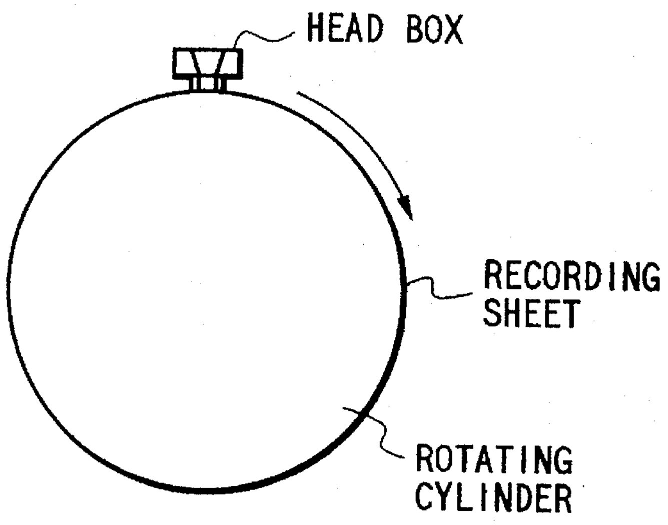
FIG. 16 is a simplified explanatory diagram showing a tester adapted to measure the permeation of ink into a recording medium.
Figure 17:
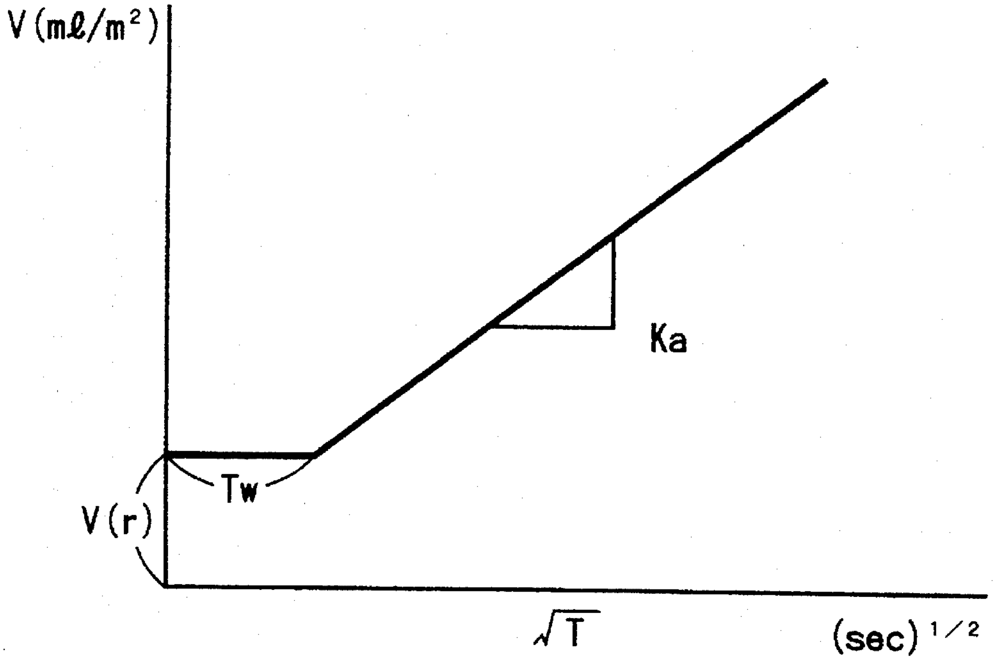
FIG. 17 is a graphical representation indicating the permeation of ink into a recording medium.

In a fifth comparison for the method of the invention, unlike the sixth embodiment, a dot matrix consisted of six (6) black ink dots and six (6) cyan dots. And, some of the ink dots were partially omitted as indicated at W in FIG. 12. Therefore, for instance the recorded line was not continuous, or uniform in pattern, thus being low in picture quality.

The ink jet recording method of the invention, being designed as described above, is able to record character images high in density on sheets of ordinary paper such as copying sheets instead of special recording sheets provided only for ink jet recording, and prevents color bleeding between images different in color.

What is claimed is:

1. An ink jet recording method in which a plurality of inks different in color are used to record a color image for a unitary picture element, said method comprising the steps of:

printing a first portion of a unitary picture element with at least one ink low in permeability; and printing a second portion of said picture element with at least one ink high in permeability, wherein the picture element is a dot matrix comprising low-permeable ink dots printed with said at least one ink low in permeability and high-permeable ink dots printed with said at least one ink high in permeability, and wherein in the picture element the at least one ink low in permeability and the at least one ink high in permeability mix with and diffuse into each other.

2. An ink jet recording method of claim 1, wherein said high-permeable ink dots are recorded adjacent to said low-permeable ink dots.

3. An ink jet recording method of claim 1, wherein a ratio in number of said high-permeable ink dots to said low-permeable ink dots is from 50% to 200%.

4. An ink jet recording method of claim 1, wherein a first imaged portion of said unitary picture element comprises lapped ink dots formed by lapping said low-permeable ink dots and said high-permeable ink dots on each other, and a second non-imaged portion of said unitary picture element that is not printed with ink.

5. An ink jet recording method of claim 4, wherein a ratio of area of said second non-imaged portion to said first imaged portion is from 0% to 100%.

6. An ink jet recording method of claim 1, wherein said ink low in permeability is a black ink.

7. An ink jet recording method of claim 6, wherein said unitary picture element is located at a boundary of image regions different in color.

8. An ink jet recording method of claim 1, wherein said printing with said at least one ink low in permeability is prior to said printing with said at least one ink high in permeability.

9. An ink jet recording method of claim 8, wherein said high-permeable ink dots are recorded adjacent to said low-permeable ink dots.

10. An ink jet recording method of claim 8, wherein said picture element comprises lapped ink dots formed by lapping said low-permeable ink dots and said high-permeable ink dots on each other.

11. An ink jet recording method of claim 1, wherein said printing with said at least one ink high in permeability is prior to said printing with said at least one ink low in permeability.

12. An ink jet recording method of claim 11, wherein said high-permeable ink dots are recorded adjacent to said low-permeable ink dots.

13. An ink jet recording method of claim 11, wherein said picture element comprises lapped ink dots formed by lapping said low-permeable ink dots and said high-permeable ink dots on each other.

14. An ink jet recording method of claim 1, wherein said ink low in permeability is of a darker color than said ink high in permeability.

15. An ink jet recording method of claim 1, wherein said unitary picture element is part of a line or character image.

16. An ink jet recording method of claim 1, wherein said at least one ink low in permeability is up to 0.5 $ml/m^2\ ms^{1/2}$ in absorption coefficient (Ka) and in a range of 50 msec to 200 msec in wet time (Tw), and said at least one ink high in permeability is up to 1.0 $ml/m^2\ ms^{1/2}$ in absorption coefficient (Ka), and up to 20 msec in wet time (Tw).

17. An ink jet recording method of claim 1, wherein said picture element comprises lapped ink dots formed by lapping said low-permeable ink dots and said high-permeable ink dots on each other.

* * * * *